US008751114B2

(12) United States Patent
Filla

(10) Patent No.: US 8,751,114 B2
(45) Date of Patent: Jun. 10, 2014

(54) METHOD FOR CONTROLLING A HYDRAULIC SYSTEM

(75) Inventor: Reno Filla, Eskilstuna (SE)

(73) Assignee: Volvo Construction Equipment AB, Eskilstuna (SE)

(*) Notice: Subject to any disclaimer, the term of this patent is extended or adjusted under 35 U.S.C. 154(b) by 188 days.

(21) Appl. No.: 12/990,496

(22) PCT Filed: May 27, 2008

(86) PCT No.: PCT/SE2008/000360
§ 371 (c)(1), (2), (4) Date: Oct. 30, 2010

(87) PCT Pub. No.: WO2009/145682
PCT Pub. Date: Dec. 3, 2009

(65) Prior Publication Data
US 2011/0060508 A1 Mar. 10, 2011

(51) Int. Cl.
*G06F 7/70* (2006.01)
*G06F 19/00* (2011.01)
*G06G 7/00* (2006.01)
*G06G 7/76* (2006.01)

(52) U.S. Cl.
USPC .......... 701/50; 701/1

(58) Field of Classification Search
USPC .......... 701/1, 50, 54, 70–77, 82–92
See application file for complete search history.

(56) References Cited

U.S. PATENT DOCUMENTS

| | | | | |
|---|---|---|---|---|
| 5,261,234 | A * | 11/1993 | Holloway et al. | 60/462 |
| 6,216,456 | B1 * | 4/2001 | Mitchell | 60/452 |
| 7,320,216 | B2 * | 1/2008 | VerKuilen et al. | 60/421 |
| 2003/0121408 | A1 | 7/2003 | Linerode et al. | |
| 2003/0121409 | A1 * | 7/2003 | Lunzman et al. | 91/459 |
| 2004/0055455 | A1 * | 3/2004 | Tabor et al. | 91/433 |
| 2004/0117092 | A1 * | 6/2004 | Budde | 701/50 |
| 2005/0278100 | A1 * | 12/2005 | Porter | 701/50 |
| 2006/0121408 | A1 * | 6/2006 | Hedge et al. | 433/53 |
| 2006/0191732 | A1 * | 8/2006 | Lunzman et al. | 180/307 |
| 2007/0073465 | A1 * | 3/2007 | Brown et al. | 701/50 |
| 2007/0095059 | A1 * | 5/2007 | VerKuilen et al. | 60/468 |

OTHER PUBLICATIONS

International Search Report for corresponding International App. PCT/SE2008/000360.
International Preliminary Report on Patentability for corresponding International App. PCT/SE2008/000360.

* cited by examiner

*Primary Examiner* — Bhavesh V Amin
(74) *Attorney, Agent, or Firm* — WRB-IP LLP

(57) ABSTRACT

A hydraulic system control unit, a hydraulic system and a working machine for controlling a hydraulic system adapted to perform at least one hydraulic work function in a working machine are provided. The hydraulic system performs the hydraulic control function in accordance with an operation signal determined by a hydraulic system control unit. In a first step the control unit receives an operator control input associated to the work function. In a second step the control unit receives a load input indicative of a load associated to the work function. Moreover, in a third step the control unit determines the operation signal in response to the operator control input and the load input.

14 Claims, 8 Drawing Sheets

METHOD FOR CONTROLLING A HYDRAULIC SYSTEM

BACKGROUND AND SUMMARY

The invention relates to a method, a hydraulic system control unit, a hydraulic system and a working machine for controlling a hydraulic system adapted to perform at least one hydraulic work function in a working machine.

In several types of working machines with hydraulic systems, load sensing hydraulic systems have been introduced. In so-called open-center systems, i.e. hydraulic systems without load sensing, the hydraulic flow is load dependent and thus depends on system pressure or the load acting on the cylinder. FIG. 3 illustrates how a certain valve opening leads to hydraulic flow for a given load. As shown in FIG. 3, for a given constant valve opening X, increased load results in a reduced hydraulic flow. In order to achieve the same flow at increased load, the operator had to increase the angle of the hydraulic lever.

In load sensing systems the relationship between valve opening and hydraulic flow is independent of the load, as shown by line X in FIG. 4. This results in that the operator no longer has to compensate for the increased load by increasing the lever angle. The operator can keep the lever steady at a certain angle and the system will make sure to keep the flow steady.

A disadvantage with load sensing systems is that the operator no longer receives the feedback by having to compensate the increased load by increasing the lever angle. In certain situations, like e.g. handling of large rocks, such a feedback is actually wanted. With a load sensing system keeping the flow constant, the operator (being used to flow reduction) will not feel the weight of the load and thus might handle the machine less intuitively.

It is desirable to provide a method for controlling the hydraulic system that reduces the operators' negative experiences of load sensing systems, while at the same time retaining its advantages.

According to an aspect of the present invention, a method is provided for controlling a hydraulic system adapted to perform at least one hydraulic work function in a working machine. The hydraulic system performs the hydraulic control function in accordance with an operation signal determined by a hydraulic system control unit. In a first step the control unit receives an operator control input associated to said work function. The method is particularly characterized in a second step where the control unit receives a load input indicative of a load associated to the work function. Moreover, in a third step the control unit determines the operation signal in response to the operator control input and the load input.

According to another aspect of the present invention, a hydraulic system control unit is adapted to perform the method for controlling a hydraulic system adapted to perform at least one hydraulic work function in a working machine. According to another aspect of the present invention, a hydraulic system comprising the hydraulic system control unit is provided, and a working machine comprising the hydraulic system is provided.

An advantage available through an aspect of the present invention is that the operator will receive a feedback from the hydraulic system when loading the bucket. The operator is in focus without compromising the efficiency of the hydraulic system. The operator will feel the load weight acting on the bucket.

Such a feedback is in many cases very important for the operator when operating the machine. For instance, when operating an excavator it is vital when removing large, heavy objects (pieces of rocks etc.) to feel the weight of the object. Otherwise, the excavator may tip and/or break. In the same way, the operator of a wheel loader needs feedback from the hydraulic system when loading the bucket with heavy objects. Moreover, when loading gravel from a pile, the operation will be easier. The operator will for instance feel when the bucket is about to get stuck in the gravel pile.

Other preferred embodiments and advantages of the invention will emerge from the dependent claims and the detailed description below.

BRIEF DESCRIPTION OF THE DRAWINGS

The invention will now be described in greater detail below with reference to the embodiment shown in the accompanying drawings, in which.

DETAILED DESCRIPTION

Figure 1:
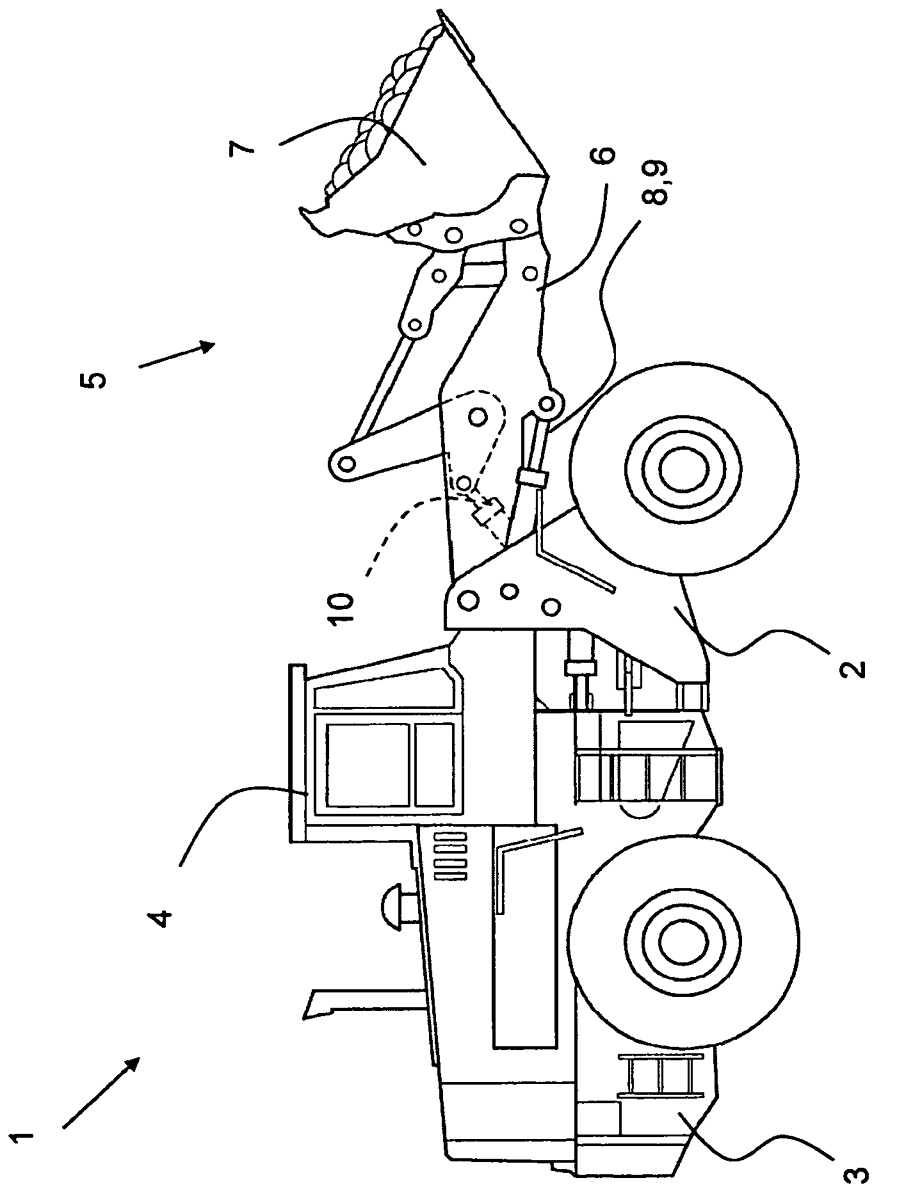
FIG. 1 shows a working machine in a side view.

The invention will now be described in detail with reference to embodiments described in the detailed description and shown in the drawings.

The invention relates to a method, a hydraulic system control unit, a hydraulic system and a working machine for controlling a hydraulic system adapted to perform at least one hydraulic work function in a working machine. The unit, the system comprising the unit and the working machine comprising the system are adapted for performing the method steps in the embodiments here described. It should therefore be understood by a person skilled in the art that the detailed description also includes that the unit, the system and the working machine are adapted to perform the method steps, even though this is not described in detail herein.

FIG. 1 shows a working machine 1 being in the form of a wheel loader. The body of the working machine 1 comprises a front body section 2 and a rear body section 3. The rear body section 3 comprises a cab 4. The body sections 2,3 are connected to each other in such way that they can pivot. The working machine 1 comprises equipment 5 for handling objects or material. The equipment 11 comprises a load-arm unit 6 and an implement 7 in the form of a bucket fitted on the load-arm unit. A first end of the load-arm unit 6 is pivotally connected to the front vehicle section 2. The implement 7 is connected to a second end of the load-arm unit 6.

The load-arm unit 6 can be raised and lowered relative to the front section 2 of the vehicle by means of two second actuators in the form of two hydraulic cylinders 8,9, each of which is connected at one end to the front vehicle section 2 and at the other end to the load-arm unit 6. The bucket 7 can be tilted relative to the load-arm unit 6 by means of a third actuator in the form of a hydraulic cylinder 10, which is connected at one end to the front vehicle section 2 and at the other end to the bucket 7 via a link-arm system. The working machine 1 has a drive line (not shown) with an internal combustion engine, an automatic gearbox and a hydrodynamic torque converter. The driveline is a common driveline and will not be described any further in this application.

Figure 2:
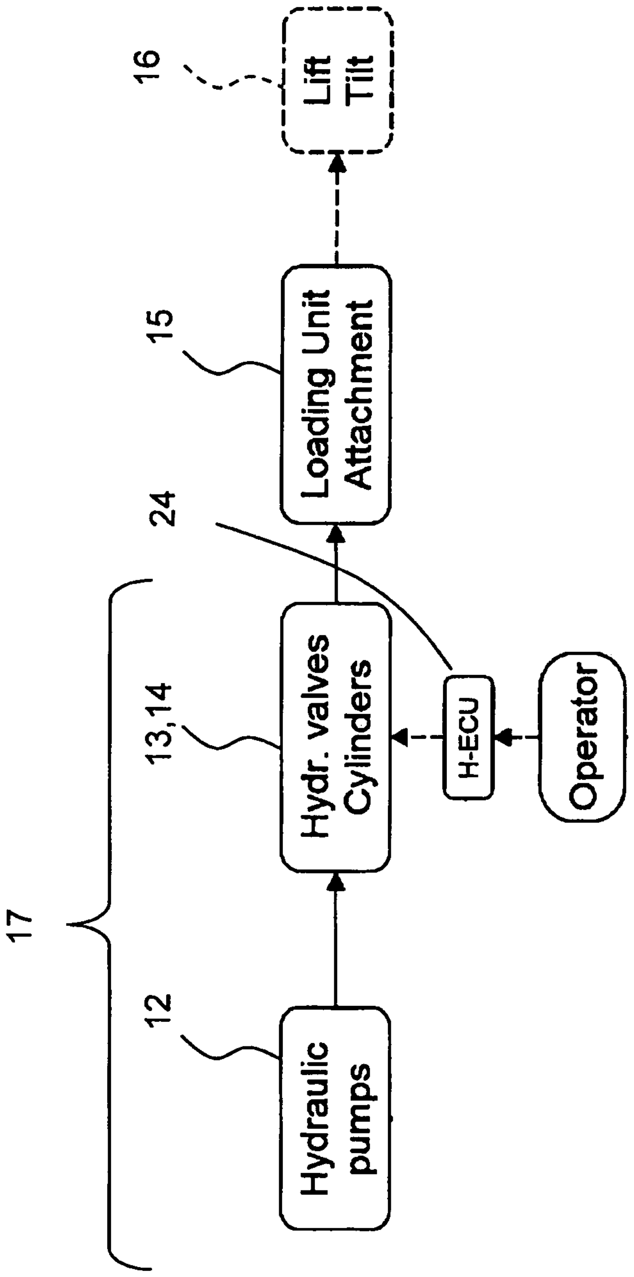
FIG. 2 shows the hydraulic system, the hydraulic system control unit and the hydraulic function.

The working machine 1 comprises a hydraulic system 17, see FIG. 2, which is adapted to perform at least one hydraulic work function in the working machine. At least one hydraulic pump 12 driven by the engine 10 via the hydrodynamic torque converter (not shown), supplies the hydraulic cylinders 8,9, 10,14 with hydraulic fluid. A number of electrically controlled hydraulic valve units 13 in the system are electrically connected to an hydraulic system control unit 24 and hydraulically connected to the cylinders 8,9,10,14 for regulating the work of these and thereby perform the hydraulic work in which the equipment is lifted and/or tilted 16. The control unit 24 may also control the pump displacement and/or speed. The hydraulic system performs the work function by operating 16 the equipment 5 via the loading unit attachment 15.

The hydraulic system 17 performs the hydraulic work function in accordance with an operation signal determined by a hydraulic system control unit 24. The hydraulic system receives the operation signal from the hydraulic system control unit 24 and the system (the valves 13 and/or the pump) is operated on the basis of the operation signal so that a flow is created in the cylinders 8,9,10,14 and the work function is performed.

The control unit 24 is coupled to a number of electric operator levers arranged in the cab 4. The control unit receives 30, see FIG. 7, from these levers when operated, an operator control input associated to said work function. An operator control input associated to said work function means that the operator initiates the hydraulic work function when operating said levers. The levers could be replaced by any other means for operating the hydraulic system, such as a joystick, a button or a touch screen.

Figure 3:
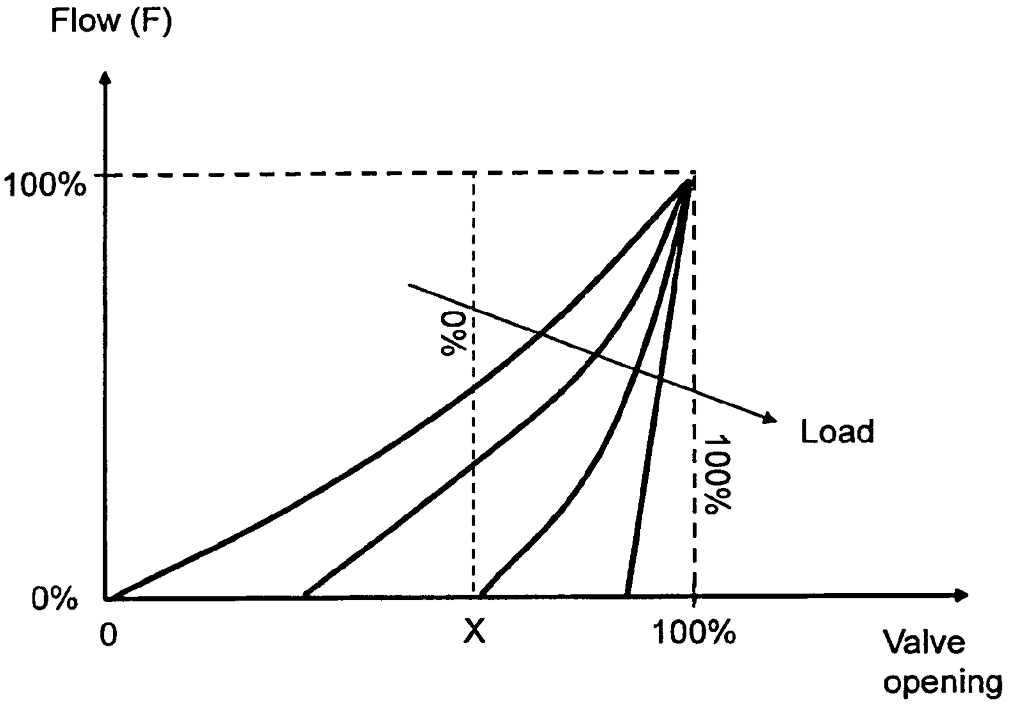
FIG. 3 illustrates how the load on a bucket influences the hydraulic flow in the hydraulic system prior to the introduction of a load sensing system.
Figure 4:
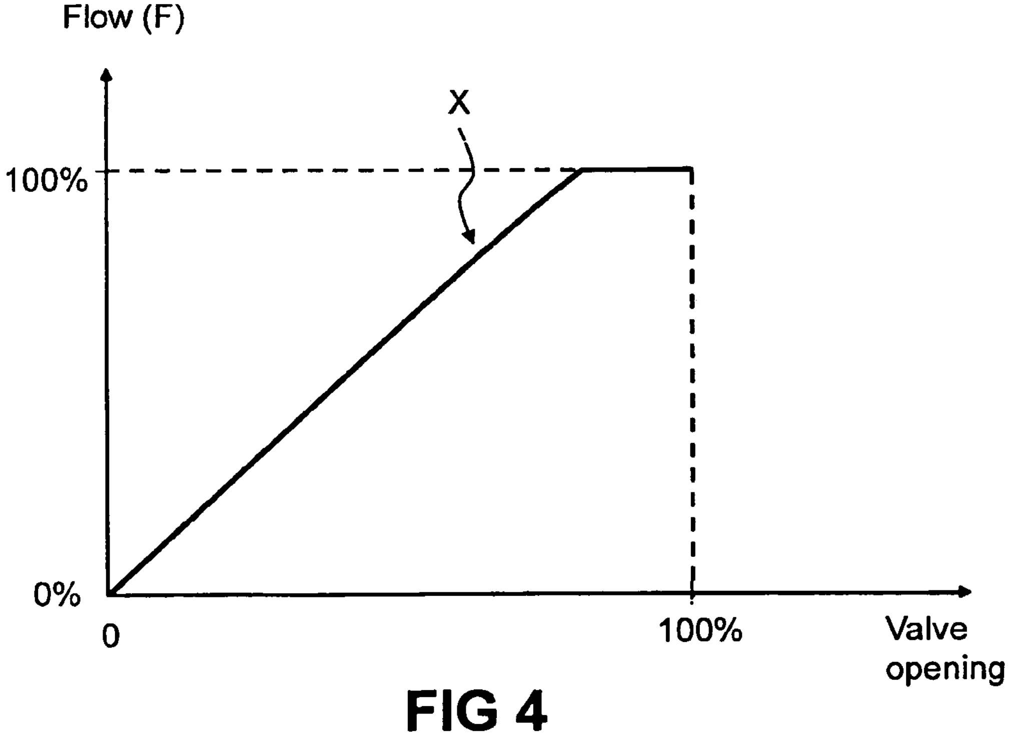
FIG. 4 illustrates the load-independency of the hydraulic flow in the hydraulic system with load sensing.

One problem with the load sensing systems now present in the working machines (for instance an excavator or a wheel loader) is that the operator no longer receives the feedback by having to compensate the increased load on the bucket by pulling the operation lever and thereby increase the operator control input. This is shown in FIG. 3, where the hydraulic system 17 keeps the flow constant.

The operator will experience a situation where he instinctively expects a decreased hydraulic flow. The reason is that most operators are used to the hydraulic systems 17 in working machines 1 prior to the introduction of load sensing systems. With a load sensing system keeping the flow constant, the operator (being used to flow reduction) will feel as if the load is very low, until it is so high that the bucket gets stuck.

Since the operator is used to the feedback of reduced flow caused by the increased load on the bucket, the load sensing systems having load-independent flow, are experienced in a negative way by the operator in such situations. On the other hand, load sensing systems have highly desirable performance and efficiency advantages. It is desirable therefore to provide a method for controlling the hydraulic system 17 that reduces the operators' negative experiences of load sensing systems, while at the same time retaining its advantages.

Figure 5:
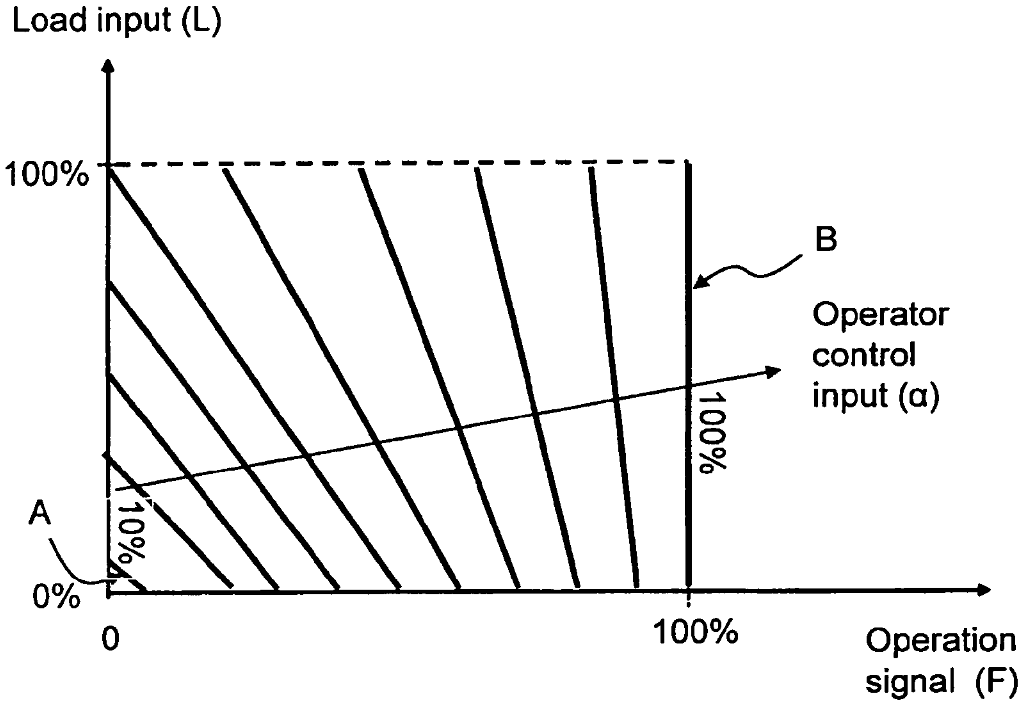
FIG. 5 illustrates how the load on a bucket influences the hydraulic flow in the hydraulic system having a hydraulic system control unit according to one embodiment of the present invention.
Figure 6:
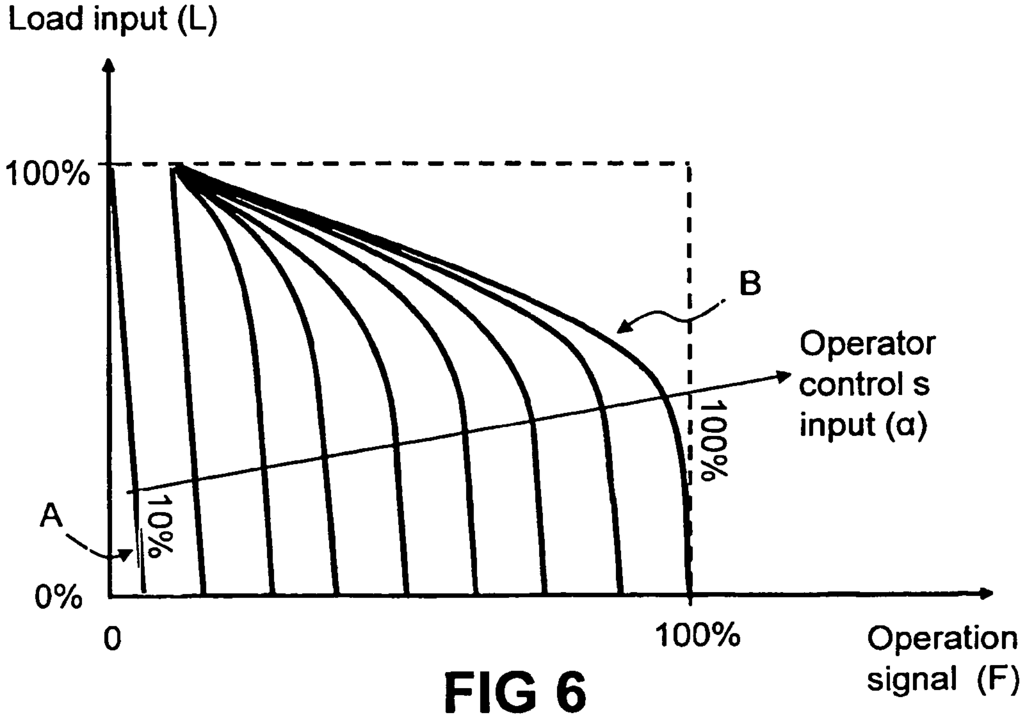
FIG. 6 illustrates how the load on a bucket influences the hydraulic flow in the hydraulic system having a hydraulic system control unit according to another embodiment of the present invention.
Figure 7:
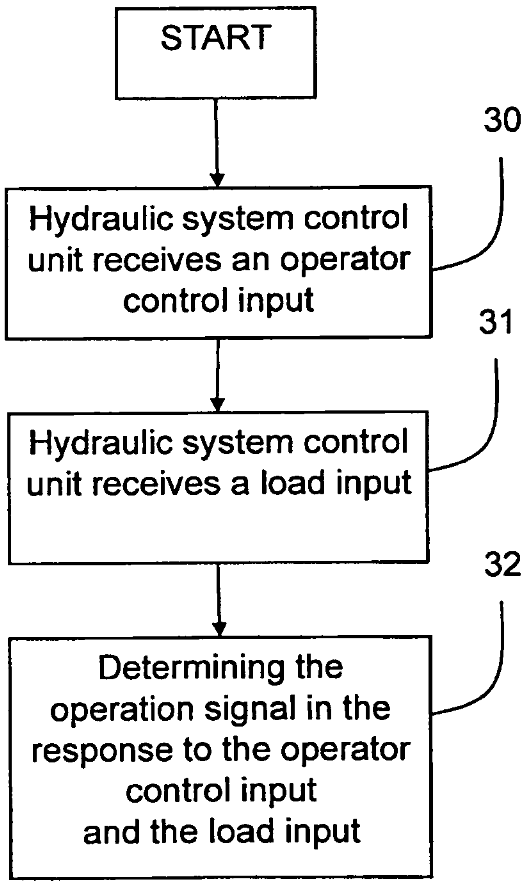
FIG. 7 shows the method according to the present invention.

In an aspect of the present invention a step where the control unit 24 receives 31, see FIG. 7, a load input L indicative of a load associated to the work function. In the next step the control unit determines 32 the operation signal F in response to the operator control input $\alpha$ and the load input L. This is illustrated in FIGS. 5-6, which will be described later.

Consequently, the control unit 24 receives both inputs, and based on these calculates/computes the operation signal F. The load input is a value that indicates the load on the bucket 7 on the machine 1.

These steps give the advantage that the operator will receive a feedback from the hydraulic system 17 when loading the bucket 7. The operator is in focus without compromising the efficiency of the hydraulic system. By creating a relationship between the load input value L and the operation signal value F, an increased load on the bucket will be perceived by the operator, since the hydraulic flow is reduced.

This gives a softer hydraulic system 17 where the hydraulic flow depends on the load on the bucket. The hardware is not changed. Instead the hydraulic control signals are reinterpreted in dependency on the operating situation. Consequently, the improved hydraulic system control unit 24 provides an improved operability.

The relationship between the load input L and the operation signal F is created using a SW mechanism in the control unit 24. In practice it is defined in a control map in the hydraulic system control unit. Examples of such maps are illustrated in FIGS. 5-6, which will be described later.

In accordance with the method the control unit 24 determines a load change in the work function during operation on the basis of repeated load inputs L. The control unit 24 changes the desired speed of the work function in response to the determined load change.

In order to create the feedback, the relationship between the load input L and the operation signal F is preferably determined so that an increased load input value L results in a reduced operation signal value F. This means that the operator will feel a power loss in the hydraulic system 17 when the load on the bucket increases. The operator will then probably pull the operation lever to increase the flow F in the hydraulic system. Further details regarding the relationship will be described in relation to FIGS. 5-6.

The increased load input value L may result in a reduced operation signal value F within a first control range of the operator control input $\alpha$, the first control range being smaller than the total operating range for the operator control input $\alpha$. The operator control input $\alpha$ corresponds to an angle of the operation lever.

The part of the operating range being outside the first control range is preferably represented by an operator control input $\alpha$ of 100% (maximal lever deflection) or very close to 100%. For other input values (lever angles), the first control range, the increased load L results in a reduced operation signal value. F. The control range is preferably from 0 to approx. 99%.

The range outside the control range is illustrated by a vertical line (B) in FIG. 5. For this line there is a maximal (100%) value on the operator control input $\alpha$, which means a maximal lever deflection. The line may alternatively be almost vertical. A vertical or almost vertical line means the operation signal F does not (or almost not) depend on the load input L. This gives the operator the possibility to override the mapping (where the increased load input value results in a reduced value for the operation signal F within the control range). This is enabled by pulling the lever to maximal deflection. He will then experience a situation where there is no response on the load acting on the bucket.

Two alternatives of control maps are illustrated in FIGS. 5-6 and will be described further. Reference A represents 10% operator control input α and reference B 100% operator control input α, which is maximal lever deflection.

A new line is presented for each 10%, but this is just an example. In real life there is a line for each possible control input value α.

It should be understood by a person skilled in the art that these only illustrates examples of such maps. The relationship between the operation signal F and the load input L can vary depending on which feedback that the operator of the working machine 1 should receive. The person skilled in the art will therefore realize that particular, advantageous characteristics from these two maps (FIGS. 5-6) can be combined in various ways in order to provide a proper feedback.

The relationship between the load input L and the operation signal F may be linear over the total operating range of the operator control input α. It may as an alternative be non-linear over the total operating range of the operator control input α. This relationship differs from a load sensing system where there is no such explicit relationship. A linear relationship is shown in FIG. 5 while a non-linear relationship is shown in FIG. 6.

The relationship between the load input L and the operation signal F may be linear for some values of the control input α and non-linear for other values. This is illustrated by different lines A and B in FIG. 5.

The relationship between the load input L and the operation signal F in terms of gradient or slope may be the same for different values of the operator control input α. It may as an alternative vary for different values of the operator control input. This is illustrated by the different lines in FIG. 5. As shown, for each 10% increase of the angle (corresponding to the control input), a new line is presented.

With the non-parallel lines, the operator will experience different feedback for all lever angles, mimicking the behaviour of open-center hydraulic systems. That is, the hydraulic flow reduction will be different in relation to the load increase for all lever angles. As illustrated and discussed, 100% lever angle will still result in 100%, while lower lever angles will give lower values for the operation signal F to the hydraulic cylinder or cylinders (not shown) for all load values L.

The relationship between the load input L and the operation signal F may be linear in at least a first interval of the load input value L and non-linear in a second interval of the load input. value L for a particular value of the operator control input α. This is illustrated in FIG. 5. Reference A represents 10% α (lever angle) and reference B 100% α (maximal deflection).

The advantage with this alternative is that the endurance of the hydraulic system may be improved by significantly decreasing the possibility to increase the hydraulic flow for high load loads. Another advantage is that the risk of accidents (tipping machine etc) is reduced. Moreover, the engine power is limited, and by introduction this embodiment the power feed to the driveline is secured.

The relationship between the load input L and the operation signal F for a particular operator control input value α may be dependent on the operating state of the working machine 1. This means that the machine, either by manual input or by automatic detection, determines the operating state. One operating state may be tilling a bucket with gravel and another loading shot rock.

The advantage is that the relationship between the load and the hydraulic flow could be dependent on the operating state to provide the most suitable feedback to the operator. For instance, loading shot rock involves handling of heavier objects and benefits due to its nature from a stronger load feedback than would be the case with loading of gravel.

The load input L may be determined on the basis of a load indicating signal. Such an indicating signal is for instance the pressure in the hydraulic pump or in one or more of the hydraulic cylinders. Based on this signal the value of the operation signal F is determined so that the operator receives a feedback from the load in the implement. Increased load in the invention results in a reduced value for the operation signal. This is sent to a hydraulic-ECU on which basis the ECU controls the hydraulic cylinder.

It should be understood by a person skilled in the art that the operation signal may control the hydraulic valves 13 and/or the displacement or speed of the hydraulic pump 12. The focus is the result to be achieved, which is the controlling of the cylinders 8,9,10,14. According to one alternative the operation signal F from the hydraulic system control unit 24 controls the hydraulic valves. If the load on the bucket 7 increases the valves are controlled to reduce the flow.

According to another alternative the pump is not mechanically coupled to the combustion engine. The operation signal from the hydraulic system control unit 24 then controls the hydraulic pump 12 displacement or the pump speed. Controlling the pump speed is performed by controlling the speed of an electric engine coupled to the pump. In both alternatives this results in a feedback to the operator, who probably pulls the operation lever to increase the value of the operation signal F.

As has been described, the main scope of the present invention is to create a feedback to the operator by controlling the hydraulic system. Using different control maps creates a number of feedback alternatives. As mentioned, the alternatives of control maps illustrated in FIGS. 5-6 illustrate examples of such maps. The relationship between the load input. L and the operation signal F can vary depending on which feedback that the operator of the machine 1 should receive. The person skilled in the art will therefore realize that particular, advantageous characteristics from these two maps can be combined in various ways in order to provide a proper feedback.

Force feedback system can be coupled to the operation lever in order to create a feedback to the operator. Such a feedback may operate together with the hydraulic control described, or operate by itself.

Force feedback systems are commonly used in joysticks and steering wheels to provide people with realistic tactile feedback from a PC or console. It is widely used in medical, space and flight simulators to provide lifelike training for students and professionals who make split-second decisions based not just on sight and sound, but also on their sense of touch. This technology has been extended to PC and next-generation console gaming over the last years. In gaming, force feedback is richer, more realistic and engaging than the non-directional vibration feedback earlier used. Through the use of advanced software and electronics, force feedback can move a steering wheel or joystick as if the device were subject to real external forces.

When using force feedback to create a feedback to the operator of a working machine 1, the operator can feel in the operator lever that the machine 1 is subject to external forces. In order to create a suitable feedback, control maps could be used to create a relationship between the load L acting on the bucket and the force feedback acting on the lever. An increased load will result in an increased force feedback on the lever.

Figure 8:
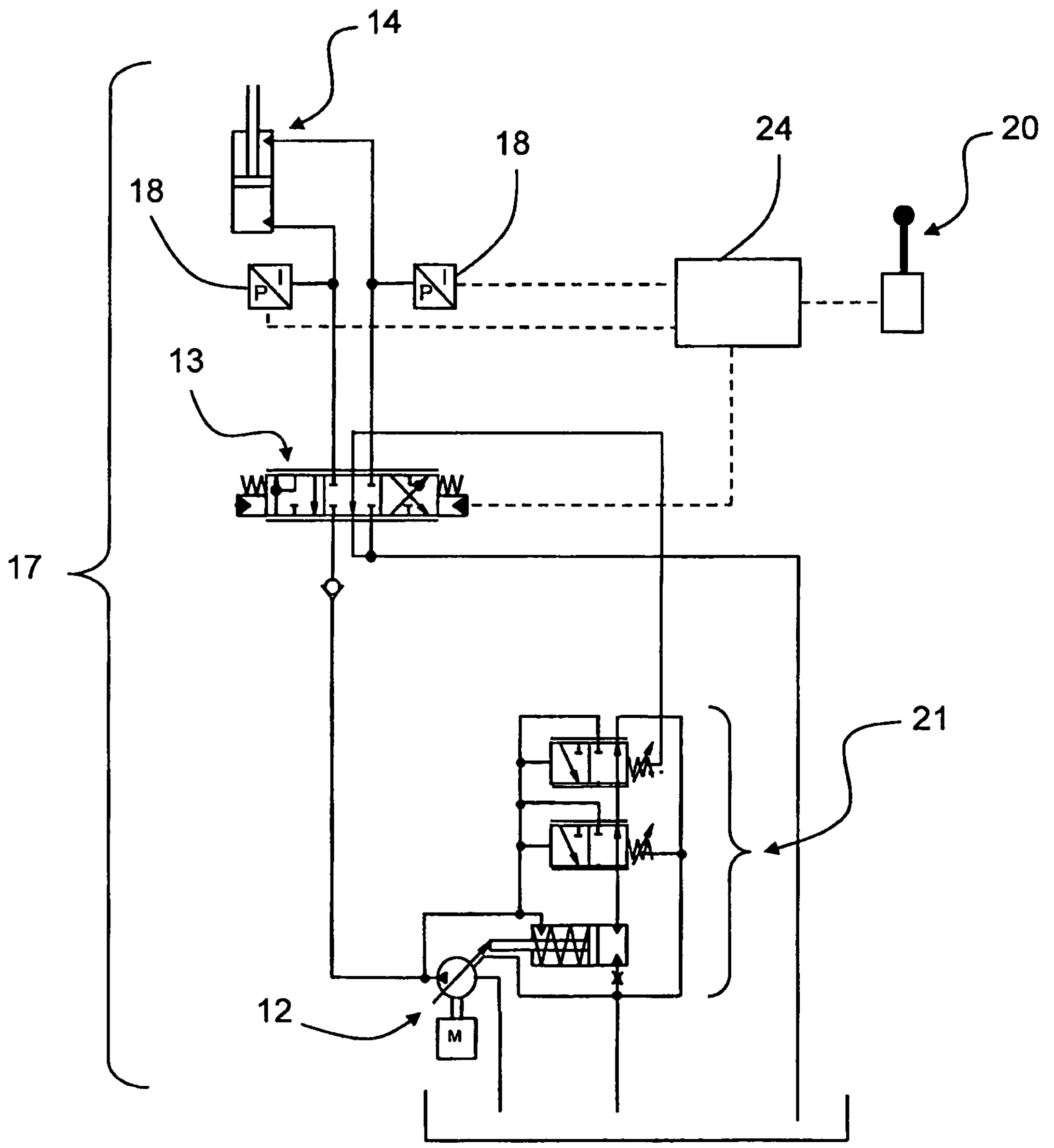
FIG. 8 illustrates a simple Load Sensing system including the present invention.
Figure 9:
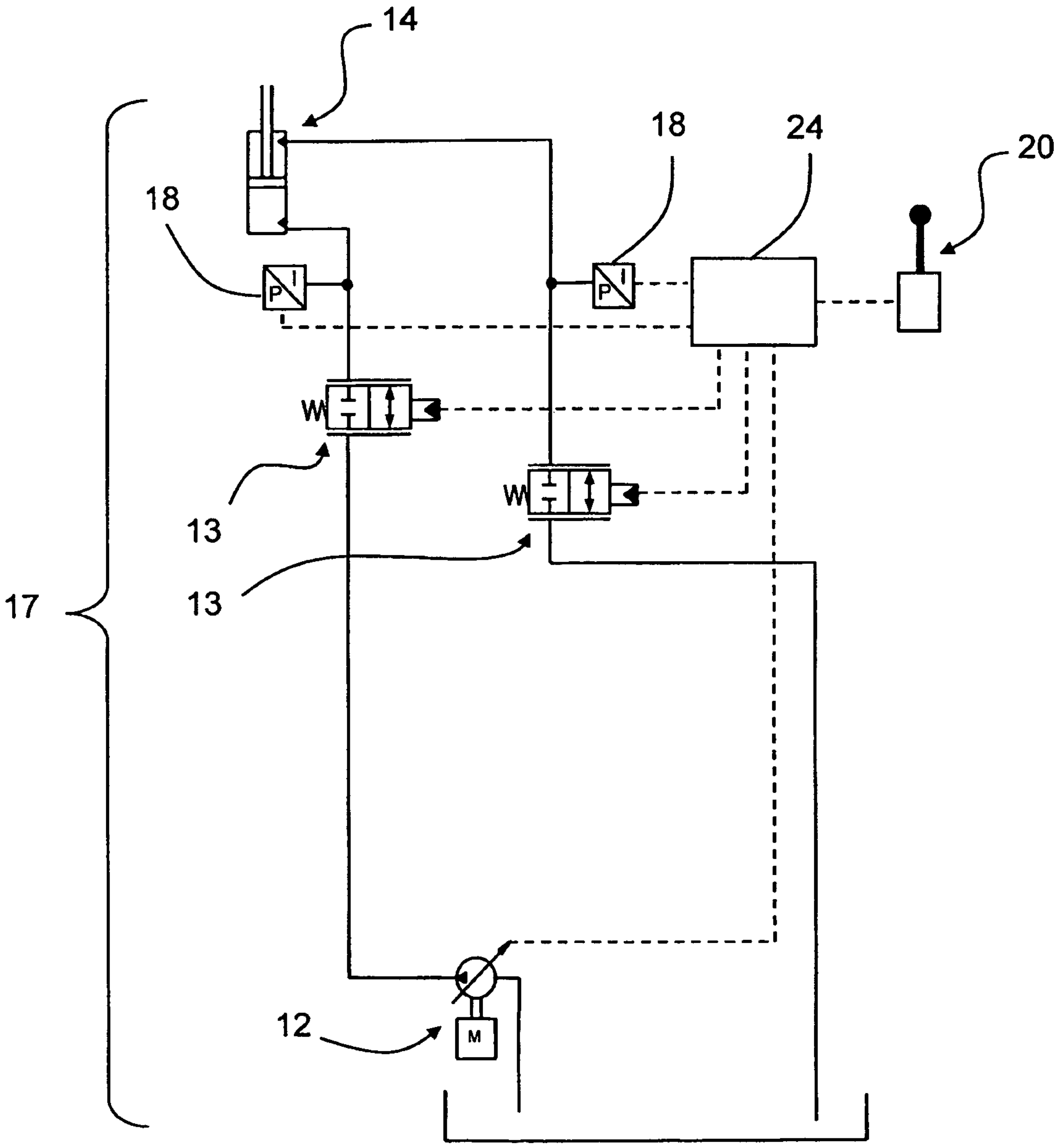
FIG. 9 illustrates a simple system for controlling the hydraulic pump deplacement including the present invention.
Figure 10:
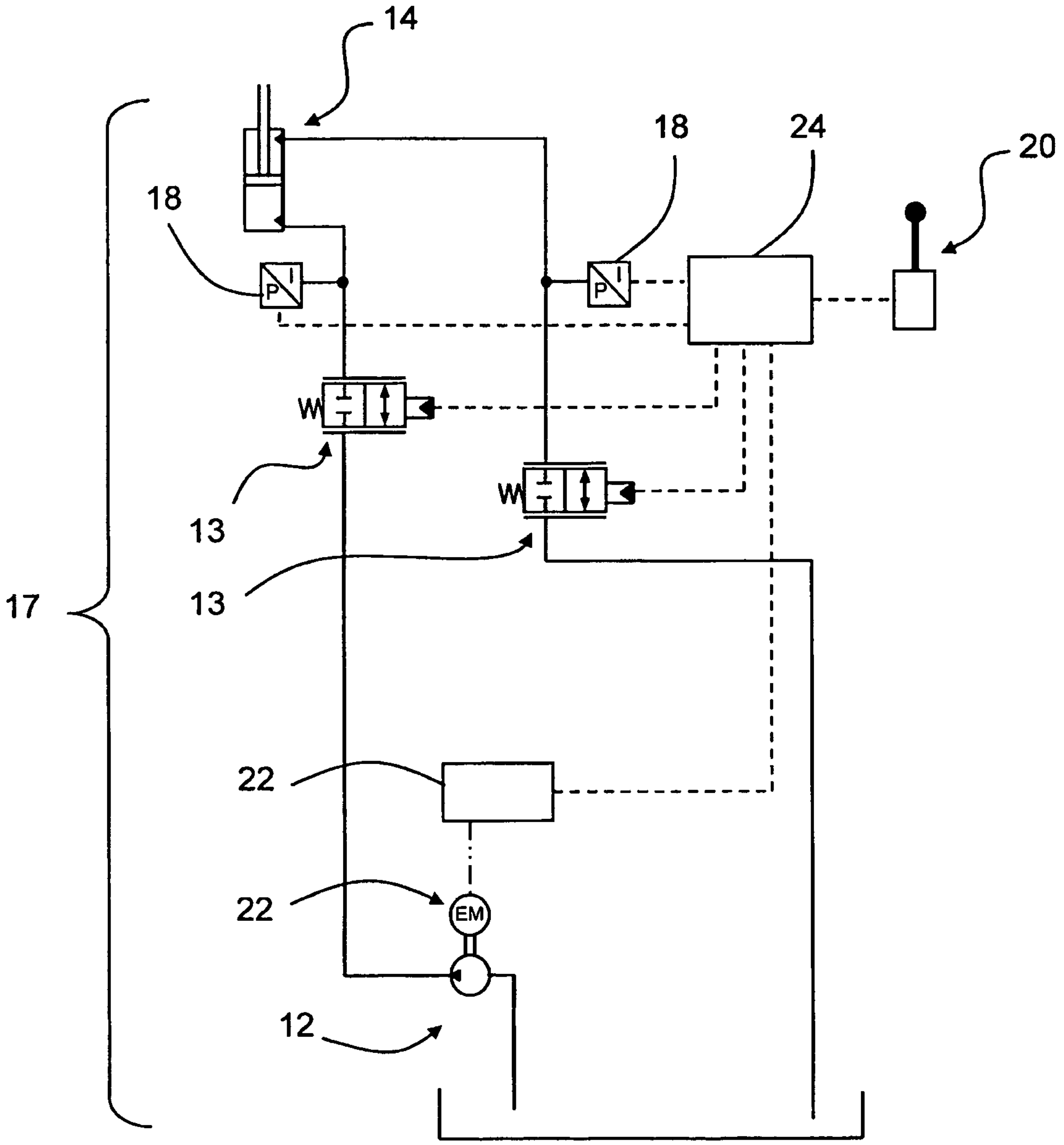
FIG. 10 illustrates a simple system for controlling the hydraulic pump speed including the present invention.

FIGS. 8-10 illustrate examples of a hydraulic system 17 including the present invention. FIG. 8 illustrates a simple Load Sensing system. In this system, prior to the introduction of the present invention, the deplacement of the hydraulic pump 12 is controlled automatically via a valves unit 21. It receives pressure inputs from the hydraulic valve 13, corresponding to the pressure in the hydraulic cylinder 14. If the load increase, the pressure input changes and the deplacement is changed. This results in a changed hydraulic pressure to compensate the increased load on the bucket 7. The control unit receives the operator control input associated to said work function from the lever 20. On the basis of the received signal, the unit determines the operation signal, which is fed to the valve 13 to control the valve. The valve in the hydraulic system 17 then performs the hydraulic control function in accordance with the operation signal.

The present invention is introduced. Pressure sensors 18 detects the pressure in the cylinder 14 and creates the load input indicative of the load associated to the work function. The load input is fed to the hydraulic system control unit 24. The control unit also receives the operator control input associated to said work function from the lever 20. On the basis of the received signals, the unit determines the operation signal, which is fed to the valve 13 to control the valve. The valve in the hydraulic system 17 then performs the hydraulic control function in accordance with the operation signal.

FIG. 9 illustrates a simple system for controlling the hydraulic pump deplacement. The operation signal is fed to the pump to control the deplacement. The operation signal from the control unit 24 is used both to control the pump and the valves 13. In the same way as described in relation to FIG. 8, the control unit receives a load input from the sensors 18 and an operator control input from the lever 20. The operation signal is then determined and thereby the hydraulic system 17 is controlled.

FIG. 10 illustrates a simple system for controlling the hydraulic pump speed. In the hydraulic system, an electric motor 22 is used to control the speed of the pump. The operation signal from the control unit 24 is used both to control the pump (via a motor control unit 23) and the valves 13. In the same way as described in relation to FIGS. 8-9, the control unit receives a load input from the sensors 18 and an operator control input from the lever 20. The operation signal is then determined by the unit and thereby the hydraulic system 17 is controlled.

The invention claimed is:

1. A method for controlling a load sensing hydraulic system adapted to perform at least one hydraulic work function in a working machine, wherein the load sensing hydraulic system comprises a hydraulic valve, a relationship between an opening of the hydraulic valve and a hydraulic flow in the load sensing hydraulic system being independent of a load sensed by the load sensing hydraulic system, and wherein the load sensing hydraulic system performs the hydraulic work function in accordance with an operation signal determined by a hydraulic system control unit, comprising:

receiving via the control unit an operator control input associated to the implement, receiving via the control unit a load input indicative of a load associated to the implement, determining via the control unit the operation signal in response to the operator control input and the load input, and determining a relationship between the load input and the operation signal so that an increased load input value results in a reduced operation signal value and thus in an opening of the hydraulic valve to a degree which results in a reduced hydraulic flow.

2. A method according to claim 1 wherein the increased load input value results in a reduced operation signal value within a first control range of the operator control input, the first control range being smaller than the total operating range of the control input.

3. A method for controlling a hydraulic system adapted to perform at least one hydraulic work function in a working machine, wherein the hydraulic system performs the hydraulic control function in accordance with an operation signal determined by a hydraulic system control unit, comprising:

receiving via the control unit an operator control input associated to the work function, receiving via the control unit a load input indicative of a load associated to the work function, determining via the control unit the operation signal in response to the operator control input and the load input, and determining a relationship between the load input and the operation signal so that an increased load input value results in a reduced operation signal value and thus in a reduced hydraulic flow, wherein a relationship between the load input and the operation signal is one of linear and non-linear over the total operating range of the operator control input.

4. A method according to claim 3, wherein a relationship between the load input and the operation signal is non-linear over the total operating range of the operator control input.

5. A method for controlling a hydraulic system adapted to perform at least one hydraulic work function in a working machine, wherein the hydraulic system comprises a moveable implement which is hydraulically operated by means of at least one hydraulic cylinder and connected to a body of the working machine by a load-arm unit, and wherein the at least one hydraulic cylinder performs the hydraulic work function in accordance with an operation signal determined by a hydraulic system control unit, comprising:

receiving via the control unit an operator control input associated to the implement, receiving via the control unit a load input indicative of a load associated to the implement, determining via the control unit the operation signal in response to the operator control input and the load input, and determining a relationship between the load input and the operation signal so that an increased load input value results in a reduced operation signal value and thus in a reduce hydraulic flow, wherein a relationship between the load input and the operation signal is linear in at least a first interval of the load input value and non-linear in a second interval of the load input value for a particular value of the operator control input.

6. A method according to claim 1, wherein a relationship between the load input and the operation signal in terms of gradient or slope is the same for different values of the operator control input.

7. A method according to claim 1, wherein a relationship between the load input and the operation signal in terms of gradient or slope varies for different values of the operator control input.

8. A method according to claim 1, wherein a relationship between the load input and the operation signal is defined in a control map in the hydraulic system control unit.

9. A method according to claim 1, wherein the operator control input corresponds to an angle of an operation lever.

10. A method according to claim 1, wherein a relationship between the load input and the operation signal for a particular operator control input value is dependent on an operating state of the working machine.

11. A method according to claim 1, wherein the load input is determined on the basis of a load indicating signal.

12. A method according to claim 1, wherein the control unit (25) determines a load change in the work function during operation on the basis of repeated load inputs.

13. A method according to claim 12 wherein the control unit changes the desired speed of the work function in response to the determined load change.

14. A working machine comprising a load sensing hydraulic system adapted to perform at least one hydraulic work function in the working machine, the load sensing hydraulic valve comprising a hydraulic valve, a relationship between an opening of the hydraulic valve and a hydraulic flow in the load sensing hydraulic system being independent of a load sensed by the load sensing hydraulic system, the working machine having a hydraulic system control unit adapted to control the load sensing hydraulic system, wherein the load sensing hydraulic system performs the hydraulic work function in accordance with an operation signal determined by a hydraulic system control unit, the hydraulic control unit controlling the load sensing hydraulic system by a method comprising:

receiving via the control unit an operator control input associated to the implement, receiving via the control unit a load input indicative of a load associated to the implement, determining via the control unit the operation signal in response to the operator control input and the load input, and determining a relationship between the load input and the operation signal so that an increased load input value results in a reduced operation signal value and thus in an opening of the hydraulic valve to a degree which results in a reduced hydraulic flow.

* * * * *